United States Patent
Hashimoto et al.

(10) Patent No.: US 8,405,239 B2
(45) Date of Patent: Mar. 26, 2013

(54) WIND-TURBINE-DYNAMIC-CHARACTERISTICS MONITORING APPARATUS AND METHOD THEREFOR

(75) Inventors: Masayuki Hashimoto, Nagasaki (JP);
Tsuyoshi Wakasa, Nagasaki (JP);
Takatoshi Matsushita, Nagasaki (JP);
Shinji Arinaga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 359 days.

(21) Appl. No.: 12/745,155

(22) PCT Filed: Jun. 18, 2008

(86) PCT No.: PCT/JP2008/061133
§ 371 (c)(1),
(2), (4) Date: Jun. 8, 2010

(87) PCT Pub. No.: WO2009/153866
PCT Pub. Date: Dec. 23, 2009

(65) Prior Publication Data
US 2010/0301606 A1    Dec. 2, 2010

(51) Int. Cl.
*F03D 9/00* (2006.01)
*H02P 9/04* (2006.01)
(52) U.S. Cl. .......................................................... 290/44
(58) Field of Classification Search ................. 290/44, 290/55
See application file for complete search history.

(56) References Cited

U.S. PATENT DOCUMENTS
4,461,957 A * 7/1984 Jallen .............................. 290/44

FOREIGN PATENT DOCUMENTS

| | | |
|---|---|---|
| CN | 101109938 A | 1/2008 |
| JP | 2002-023845 A | 1/2002 |
| JP | 2002-048050 A | 2/2002 |
| JP | 2005147047 A | 6/2005 |
| JP | 2006-037850 A | 2/2006 |
| JP | 2007-032488 A | 2/2007 |
| JP | 2008064081 A | 3/2008 |

OTHER PUBLICATIONS

Machine translation of JP 2007-32488, Jul. 9, 2012.*
Machine translation of JP 2008-064081, Jul. 9, 2012.*
Machine translation of CN 101109938, Jul. 9, 2012.*
Chinese Office Action corresponding to CN 200880118378.4 dated Jan. 6, 2012.
Notice of Allowance corresponding to KR10-2010-7011804, dated Apr. 6, 2012.
Taiwanese Office Action 097123960 issued Jul. 29, 2011.
ISR for PCT/JP2008/06113 dated Sep. 30, 2008.
Notice of Allowance for CA 2,704,988 dated Jul. 24, 2012.

* cited by examiner

*Primary Examiner* — Javaid Nasri
(74) *Attorney, Agent, or Firm* — Kanesaka Berner and Partners LLP

(57) ABSTRACT

It is an object to enable stable operation of a wind turbine and to change a control parameter of the wind turbine at an appropriate timing. A dynamic-characteristics model of a wind turbine is identified for each of a plurality of ranges that are determined in accordance with wind speed, and the identified dynamic-characteristics model is monitored for each of the ranges.

9 Claims, 6 Drawing Sheets

10 : WIND-TURBINE-DYNAMIC-CHARACTERISTICS MONITORING APPARATUS

WIND-TURBINE-DYNAMIC-CHARACTERISTICS MONITORING APPARATUS AND METHOD THEREFOR

RELATED APPLICATIONS

The present application is national phase of, and claims priority from, International Application Number PCT/JP2008/061133 filed Jun. 18, 2008, the disclosure of which is hereby incorporated by reference herein in its entirety.

TECHNICAL FIELD

The present invention relates to a wind-turbine-dynamic-characteristics monitoring apparatus and a method therefor.

BACKGROUND ART

When a wind turbine is controlled, generally, a control parameter is set when, for example, the wind turbine is built, and the wind turbine is controlled by using the control parameter.

It is desired that such a control parameter be changed to an optimal value in accordance with seasonal temperature or wind conditions, or as aging progresses. Generally, however, the control parameter, once set at the time of building, is not changed in the subsequent control operation. Thus, there is a possibility that a low-efficiency operating state may continue.

Furthermore, for example, the dynamic characteristics of driving devices used to change the pitch angle of wind-turbine blades, such as actuators, conceivably change as aging progresses; however, the dynamic characteristics regarding those driving devices are not monitored. Therefore, regarding actuators or the like, the occurrence of a problem is noticed with an alarm or the like that is issued once the problem has occurred, so that it has been difficult to prevent the occurrence of problems in these devices.

Furthermore, for example, Patent Citation 1 discloses a system in which a compensation controller and a parameter identifier are provided in a pitch-angle control system that outputs a pitch-angle instruction value to control the pitch angle of wind-turbine blades. In this system, an operation amount obtained by adding a control compensation instruction value output from the compensation controller to an operation amount calculated by the pitch-angle control system is output as a final pitch-angle control instruction. In this system, the parameter identifier identifies a parameter of a wind power generator online, and the identified parameter is used in the compensation controller to obtain the control compensation instruction value.

Patent Citation 1: Japanese Unexamined Patent Application, Publication No. 2006-37850

DISCLOSURE OF INVENTION

In the system of Patent Citation 1, a compensation controller and a parameter identifier are provided, and the parameter identifier identifies a parameter for the compensation controller online, thereby calculating a control compensation instruction value. According to this method, however, since the control parameter of a main controller is fixed, there is a possibility that the control characteristics of the main controller could be degraded due to seasonal changes in temperature or wind conditions, or due to aging. Furthermore, since the dynamic characteristics are not monitored, there is a problem in that it is not possible to detect a change in the characteristics of the wind turbine.

The present invention has been made in order to overcome the above problems, and it is an object thereof to provide a wind-turbine-dynamic-characteristics monitoring apparatus and a method therefor with which, by directly adjusting a control parameter of a main controller, it is possible to maintain the control performance of the controller even in a case where aging or the like occurs and to detect a change in the characteristics of a wind-turbine system.

In order to overcome the above problems, the present invention employs the following solutions.

A first aspect of the present invention is a wind-turbine-dynamic-characteristics monitoring apparatus including an identifying unit that identifies a dynamic-characteristics model of a wind turbine for each of a plurality of operating ranges that are determined in accordance with wind speed; and a monitoring unit that monitors, for each of the ranges, the dynamic-characteristics model identified by the identifying unit.

Since the dynamic characteristics of a wind turbine are highly non-linear in relation to the wind speed, it is difficult to analyze the dynamic characteristics with a high level of performance. In this aspect, since classification into a plurality of ranges is performed on the basis of the wind speed and identification is performed on a per-range basis, it becomes possible to perform identification within a range where linearity is maintained. Accordingly, it becomes possible to improve the dynamic-characteristics monitoring performance.

For example, the ranges are classified into a first operating range, in which the pitch angle is fixed and the rotation speed is adjusted so that the generator output reaches a maximum output point, a second operating range, in which the pitch angle is fixed and the generator output is adjusted so that the rotation speed becomes the rated rotation speed, and a third operating range, in which the pitch angle is controlled so that the rotation speed and output become constant.

In the wind-turbine-dynamic-characteristics monitoring apparatus, the monitoring unit may monitor, for each of the operating ranges, temporal variation of a predetermined dynamic-characteristics parameter in the dynamic-characteristics model identified by the identifying unit and determine whether adjustment of a control parameter of the wind turbine is needed on the basis of the temporal variation of the dynamic-characteristics parameter.

In this case, instead of adjusting the control parameter periodically, it becomes possible to adjust the control parameter when degradation or the like at or exceeding a certain level is observed in the dynamic characteristics. Accordingly, it is possible to change the control parameter at an appropriate timing.

For example, the monitoring unit may determine that adjustment of the control parameter of the wind turbine is needed when the value of the predetermined dynamic-characteristics parameter changes relative to an initial value by an amount exceeding a predetermined amount of change that is set in advance.

For example, the dynamic-characteristics model is represented by a transfer function including a dead time, and the monitoring unit may determine the timing for adjustment of the control parameter on the basis of temporal variations of at least one of the dead time and a coefficient of the transfer function. The transfer function including the dead time encompasses second-order or higher-order transfer, functions.

In the wind-turbine-dynamic-characteristics monitoring apparatus, the monitoring unit may classify the predetermined dynamic-characteristics parameter into a plurality of classes on the basis of wind speed or a combination of wind speed and wind direction and may monitor the temporal variation of the dynamic-characteristics parameter for each of the classes.

By monitoring the temporal variation of the dynamic-characteristics parameter for each of the classes based on wind speed or a combination of wind speed and wind direction, it becomes possible to ascertain the dynamic characteristics of the wind turbine more accurately.

A second aspect of the present invention is a wind-turbine-monitoring system that monitors the operation status of a plurality of wind turbines and issues control instructions to the plurality of wind turbines, including one of the wind-turbine-dynamic-characteristics monitoring apparatuses described above.

A third aspect of the present invention is a wind-turbine-dynamic-characteristics monitoring method wherein a dynamic-characteristics model of a wind turbine is identified for each of a plurality of operating ranges that are determined in accordance with an operation control method, and the identified dynamic-characteristics model is monitored for each of the operating ranges.

According to the present invention, an advantage is afforded in that stable operation of a wind turbine is enabled, and it is possible to change a control parameter of a wind turbine at an appropriate timing.

BEST MODE FOR CARRYING OUT THE INVENTION

An embodiment of a wind-turbine-dynamic-characteristics monitoring apparatus and a method therefor according to the present invention will be described below with reference to the drawings.

Figure 1:
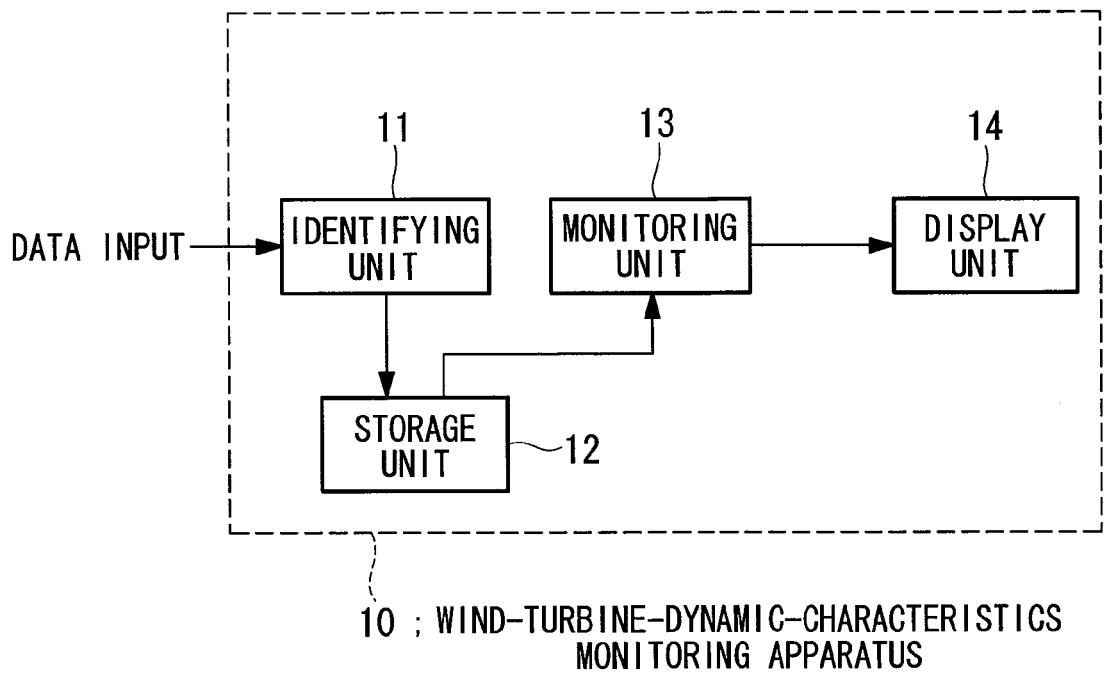
FIG. 1 is a functional block diagram showing an overview of the functions of a wind-turbine-dynamic-characteristics monitoring apparatus according to an embodiment of the present invention.
Figure 2:
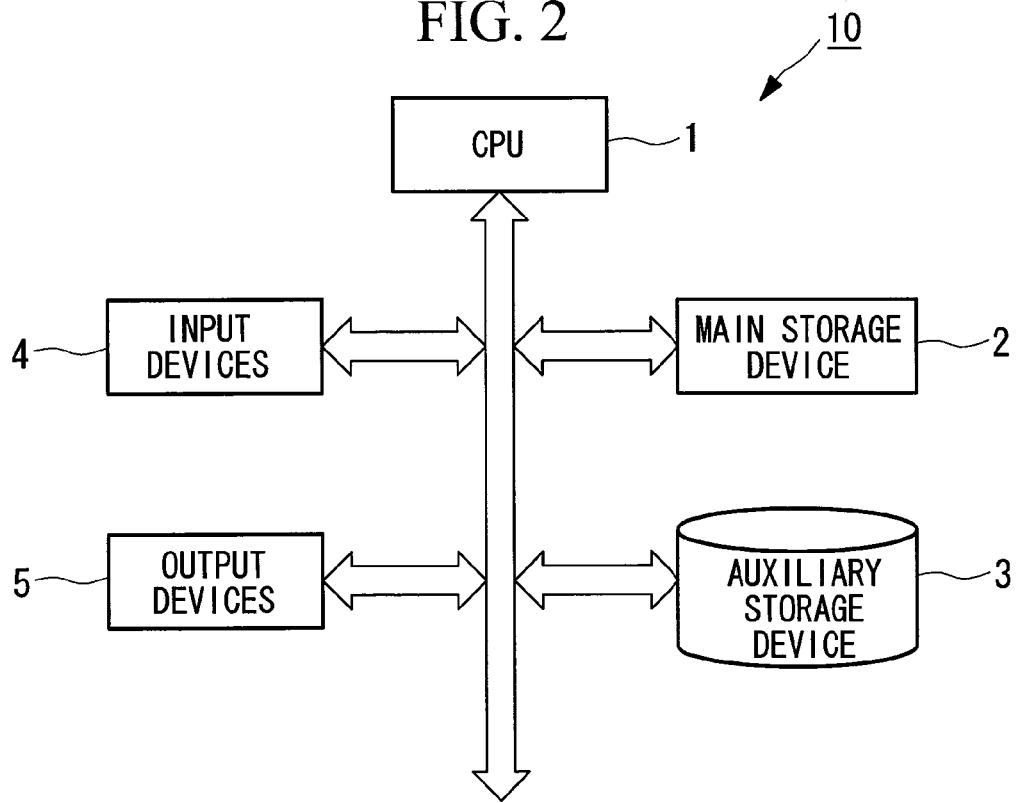
FIG. 2 is a diagram showing the hardware configuration of the wind-turbine-dynamic-characteristics monitoring apparatus according to the embodiment of the present invention.

FIG. 1 is a functional block diagram showing an overview of the functions of a wind-turbine-dynamic-characteristics monitoring apparatus according to an embodiment of the present invention, and FIG. 2 is a diagram showing the hardware configuration of the wind-turbine-dynamic-characteristics monitoring apparatus according to the embodiment of the present invention.

As shown in FIG. 1, a wind-turbine-dynamic-characteristics monitoring apparatus 10 according to this embodiment includes an identifying unit 11, a storage unit 12, a monitoring unit 13, and a display unit 14.

For example, as shown in FIG. 2, the wind-turbine-dynamic-characteristics monitoring apparatus 10 is a computer system (computing system), and its configuration includes a CPU (Central Processing Unit) 1, a main storage device 2, such as a RAM (Random Access Memory), an auxiliary storage device 3, such as an HDD (Hard Disk Drive), input devices 4, such as a keyboard and a mouse, output devices 5, such as a monitor and a printer, and so forth.

The auxiliary storage device 3 stores various programs therein, and various types of processing are realized by the CPU 1 reading out the programs from the auxiliary storage device 3 into the main storage device 2 and executing the programs.

Referring to FIG. 1, the identifying unit 11 identifies a dynamic-characteristics model of a wind turbine for each of a plurality of operating ranges that are determined in accordance with wind speed.

Figure 3:
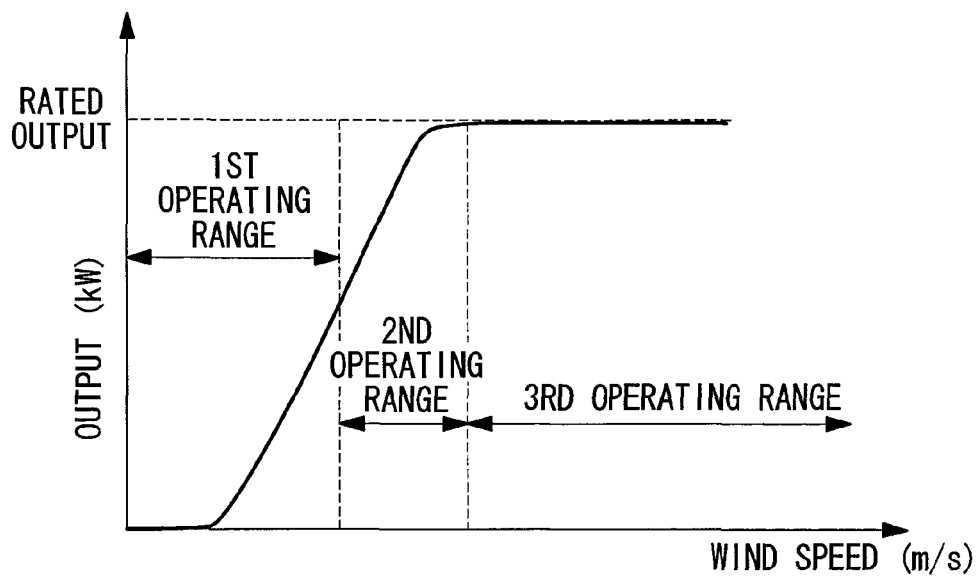
FIG. 3 is a diagram illustrating classification of operating ranges.

In this embodiment, the operating ranges are classified into three ranges, as shown in FIG. 3.

A first operating range is a range with the lowest wind speed, in which the pitch angle is fixed and the rotation speed is controlled so that the generator output reaches a maximum output point. A second operating range is a range with intermediate wind speed, in which the pitch angle is fixed and the generator output is controlled so that the rotation speed becomes the rated rotation speed. A third operating range is a range with the highest wind speed, in which the pitch angle is controlled so that the rotation speed and output become constant. In the first operating range and second operating range, the pitch angle is fixed to a pitch angle at which the generator output becomes maximum.

Figure 4:
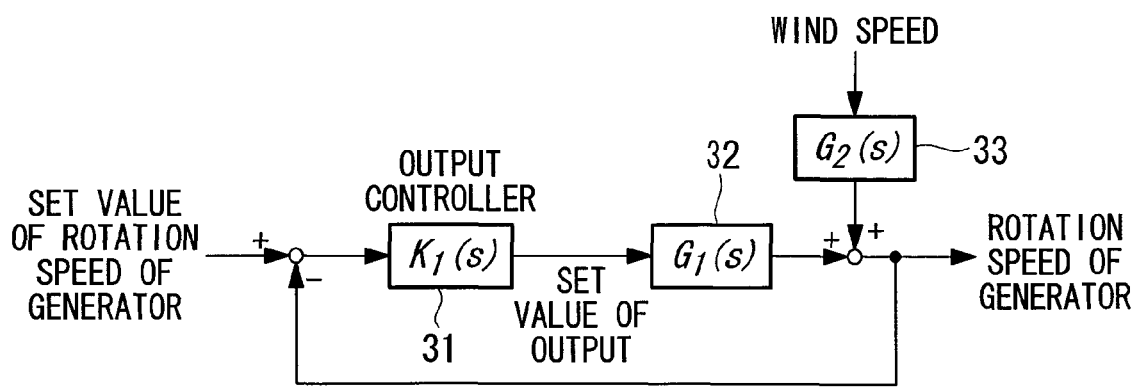
FIG. 4 is a diagram showing an identification model in the case of a first operating range and a second operating range.

In the first operating range and second operating range, because the pitch angle is fixed and the generator output is controlled with the rotation speed of the generator, an identification model shown in FIG. 4 is used.

In the identification model shown in FIG. 4, $G_1(s)$ and $G_2(s)$ are transfer functions (dynamic-characteristics models) representing the dynamic characteristics to be identified. Referring to FIG. 4, the difference between a set value of the rotation speed of the generator and an actual rotation speed of the generator is input to an output controller 31, and a set value of the output, which is output therefrom, serves as an input to a first dynamic-characteristics model 32. Furthermore, the wind speed serves as an input to a second dynamic-characteristics model 33. The output of the first dynamic-characteristics model 32 and the output of the second dynamic-characteristics model 33 are added together, and the result is used as a rotation speed of the generator.

As the output controller 31, for example, a P controller, a PI controller, a PID controller, or the like may be employed.

Figure 5:
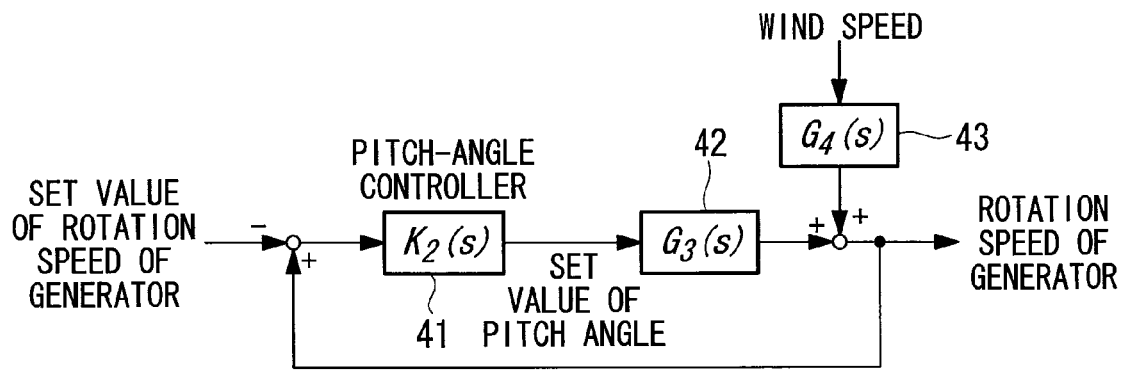
FIG. 5 is a diagram showing an identification model in the case of a third operating range.

In the third operating range shown in FIG. 3, because the pitch angle is controlled so that the rotation speed and output become constant, an identification model shown in FIG. 5 is used.

In the identification model shown in FIG. 5, $G_3(s)$ and $G_4(s)$ are transfer functions (dynamic-characteristics models) representing the dynamic characteristics to be identified. Referring to FIG. 5, the difference between a set value of the generator and an actual rotation speed of the generator is input to a pitch-angle controller 41, and a set value of the pitch angle, which is output therefrom, serves as an input to a third dynamic-characteristics model 42. Furthermore, the wind speed serves as an input to a fourth dynamic-characteristics model 43. The output of the third dynamic-characteristics model 42 and the output of the fourth dynamic-characteristics model 43 are added together, and the result is used as a rotation speed of the generator.

As the pitch-angle controller 41, for example, a P controller, a PI controller, a PID controller, or the like may be employed.

Figure 6:
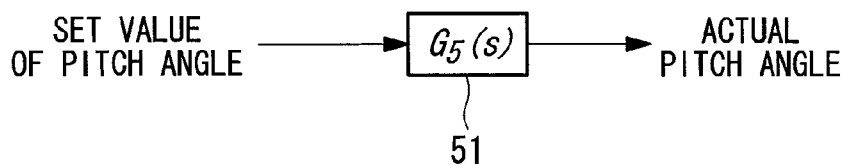
FIG. 6 is a diagram showing an identification model for pitch-angle control.

Furthermore, for the purpose of pitch-angle control, an identification model shown in FIG. 6 is used. Referring to FIG. 6, a set value of the pitch angle serves as an input to a fifth dynamic-characteristics model 51, and the output thereof serves as an actual pitch angle.

All the dynamic-characteristics models $G_1(s)$ to $G_5(s)$ shown in FIGS. 4 to 6 are represented by transfer functions including dead times as elements. Identification of a dynamic-characteristics model by the identifying unit 11 is performed according to the following procedure. Here, a description will be given in the context of the dynamic-characteristics model $G_1(s)$ as an example.

For example, the dynamic-characteristics model $G_1(s)$ is represented by equation (1) below in the form of a first-order transfer function including a first-order delay and a dead time as elements.

[Formula 1]

$$G_1(s) = \frac{K_1 e - L_1 s}{1 + T_1 s} \quad (1)$$

Discretizing equation (1) above by a z transform yields equation (2) below.

[Formula 2]

$$G_1(z) = \frac{K_1(1 - a_1)z - l_1}{z - a_1} \quad (2)$$

Here,
$a_1 = \exp(-T_s/T_1)$,
$L_1 = l_1 T_s$
$(l_1 = 0, 1, 2, \ldots)$

Letting the input and output at this time be denoted by $U(z)$ and $Y(z)$, respectively, a recurrence equation expressed as equation (3) below is obtained.

[Formula 3]

$$y(k)=a_1 y(k-1)+K_1(1-a_1)u(k-l_1-1) \quad (3)$$

Then, from equation (3) above, by applying a known linear prediction method to actual input and output data, coefficients $a_1$, $K_1$, and $l_1$ are obtained individually. Furthermore, from the coefficients $a_1$, $K_1$, and $l_1$, dynamic-characteristics parameters $T_1$, $K_1$, and $L_1$ regarding the time constant, gain, and dead time of the first dynamic-characteristics model $G_1(s)$ represented by equation (1) are calculated individually.

By using the above solving method, the identifying unit 11 calculates the values of the dynamic-characteristics parameters for the other dynamic-characteristics models $G_2(s)$ to $G_5(s)$. The method of identification by the identifying unit 11 is not limited to the above example, and the dynamic-characteristics parameters $T_1$, $K_1$, and $L_1$ in equation (1) given earlier may be individually calculated directly from a time response waveform.

The storage unit 12 stores the dynamic-characteristics parameters calculated by the identifying unit 11 in association with time information and wind speed for each of the operating ranges.

The monitoring unit 13 obtains a specific dynamic-characteristics parameter for each of the operating ranges among the dynamic-characteristics parameters stored in the storage unit 12, and, for each of the operating ranges, classifies the obtained dynamic-characteristics parameter into a plurality of classes on the basis of the wind speed, and creates a temporal variation table representing the temporal variation of the dynamic-characteristics parameter for each class.

Figure 7:
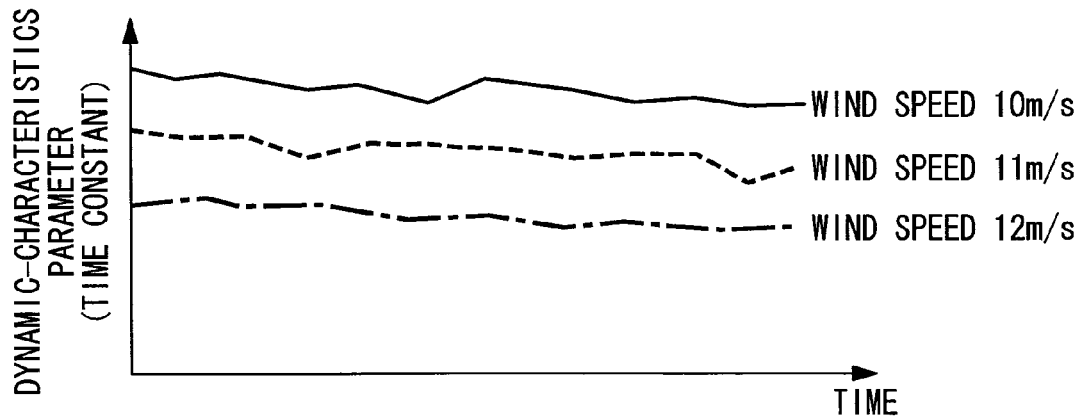
FIG. 7 is a diagram showing an example of a temporal variation table.

FIG. 7 shows a temporal variation table for the first operating range in a case where the time constant is chosen as the specific dynamic-characteristics parameter. In FIG. 7, the horizontal axis represents time and the vertical axis represents the dynamic-characteristics parameter (e.g., the time constant), and the wind speed is classified on a per-one-meter basis.

Upon creating the temporal variation table for each of the operating ranges, the monitoring unit 13 outputs the created temporal variation table to the display unit 14. Although the above description relates to the case where a temporal variation table regarding the time constant is created, the dynamic-characteristics parameter that is chosen is not limited to the time constant.

For example, other dynamic-characteristics parameters may be chosen, or a plurality of dynamic-characteristics parameters may be chosen and temporal variation tables may be created individually for the dynamic-characteristics parameters. Furthermore, although classification into a plurality of classes is performed in accordance with wind speed in the above example, without limitation to the example, for instance, classification may be performed on the basis of a combination of wind speed and wind direction.

Furthermore, it is assumed that, in the case where classification is performed by the monitoring unit 13 on the basis of a combination of wind speed and wind direction as described above, the dynamic-characteristics parameters stored in the storage unit 12 are associated with the wind speeds and wind directions at the time of acquisition of the dynamic-characteristics parameters.

Furthermore, on the basis of the temporal variation table created, the monitoring unit 13 determines whether adjustment of a control parameter of a wind turbine is needed. Specifically, when the value of the dynamic-characteristics parameter in the temporal variation table changes by an amount exceeding a predetermined amount of change (e.g., 20%), which is set in advance, relative to an initial value (or a value at the time of adjustment of the control parameter if adjustment of the control parameter has been performed), it is determined that adjustment of the control parameter of the wind turbine is needed, and a message to that effect is output to the display unit 14.

The display unit 14 notifies the user by displaying the message to the effect that adjustment of the control parameter is needed.

Next, the operation of the thus-configured wind-turbine-dynamic-characteristics monitoring apparatus will be described with reference to FIG. 8.

First, data corresponding to inputs and outputs of the dynamic-characteristics models $G_1(s)$ to $G_5(s)$ in the identification models shown in FIGS. 4 to 6, for example, a set value of the output, a set value of the pitch angle, a wind speed, and so forth, are input to the identifying unit 11.

Figure 8:
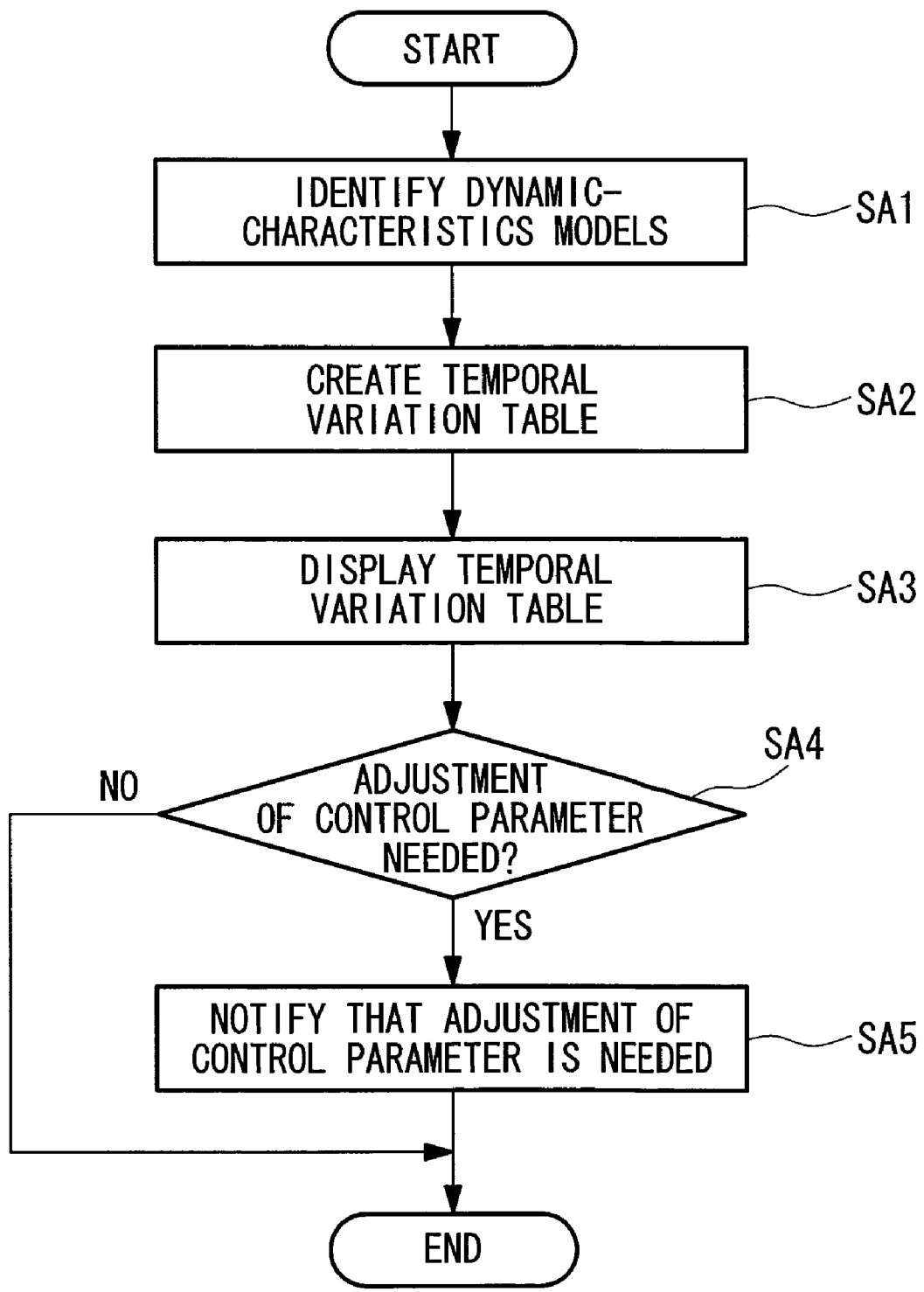
FIG. 8 is a chart showing an operation flow of the wind-turbine-dynamic-characteristics monitoring apparatus according to the embodiment of the present invention.

The identifying unit 11 identifies an operating range on the basis of the wind speed and identifies dynamic-characteristics models by using an identification model associated with the identified operating range to calculate dynamic-characteristics parameters (Step SA1 in FIG. 8).

Specifically, in the case of the first or second operating range, the dynamic-characteristics parameters of the dynamic-characteristics models $G_1(s)$ and $G_2(s)$ are calculated by using the identification model shown in FIG. 4, and the dynamic-characteristics parameters calculated are output to the storage unit 12 in association with the wind speed, operating range, and time.

On the other hand, in the case of the third operating range, the dynamic-characteristics parameters of the dynamic-characteristics models $G_3(s)$ to $G_5(s)$ are calculated by using the identification models shown in FIGS. 5 and 6, and the dynamic-characteristics parameters calculated are output to the storage unit 12 in association with the wind speed, operating range, and time.

Thus, the dynamic-characteristics parameters calculated by the identifying unit 11 are stored in the storage unit 12 in association with the operating range, etc.

Then, the monitoring unit 13 reads out the dynamic-characteristics parameters and the associated data stored in the storage unit 12 at predetermined time intervals, creates a temporal variation table, such as the one shown in FIG. 17, on the basis of these pieces of information, and outputs it to the display unit 14 (step SA2 in FIG. 8). Thus, the temporal variation table created by the monitoring unit 13 is displayed on the display unit 14 (Step SA3 in FIG. 8). Accordingly, the user is able to confirm the temporal variation of the dynamic-characteristics parameter.

Furthermore, on the basis of the temporal variation table, the monitoring unit 13 determines whether adjustment of a control parameter is needed (SA4 in FIG. 8). If it is determined, as a result, that adjustment of the control parameter is needed, a signal to that effect is output to the display unit 14. Thus, a message to the effect that adjustment of the control parameter is needed is displayed on the display unit 14, so that it becomes possible to notify the user (Step SA5 in FIG. 8).

Furthermore, when it is determined by the monitoring unit 13 that adjustment of the control parameter is needed, the control parameter is adjusted by a control-parameter adjusting unit, which is not shown. Specifically, PID parameters of the output controller 31 shown in FIG. 4 and the pitch-angle controller 41 shown in FIG. 5 are adjusted. For the adjustment of PID parameters, known methods can be employed, such as the known ultimate sensitivity method of Ziegler & Nichols or Kitamori's method.

As described hereinabove, with the wind-turbine-dynamic-characteristics monitoring apparatus 10 according to this embodiment, it is possible to ascertain variations in dynamic characteristics of a wind turbine. Accordingly, it becomes possible to change to an appropriate control parameter at an appropriate timing in accordance with the status of the driving system of the wind turbine, which serves to prevent a reduction in the operating efficiency.

Furthermore, with the wind-turbine-dynamic-characteristics monitoring apparatus 10 according to this embodiment, operating ranges are classified within a range where linearity is maintained, and a dynamic-characteristics model is identified for each of the operating ranges. Accordingly, it is possible to attain reliable identification results.

Furthermore, regarding the pitch driving system, such as an actuator, by observing the temporal variation of a dynamic-characteristics parameter, it is possible to ascertain the degree of degradation regarding the response of the driving system. Accordingly, for example, it becomes possible to notify the user at an early timing that application of grease, on-site inspection of the machine, etc. is needed. As a result, for example, it becomes possible to perform maintenance before operation of the wind turbine becomes impossible due to the occurrence of an operating problem regarding the pitch angle.

Although the dynamic-characteristics models $G_1(s)$ to $G_5(s)$ are represented by first-order transfer functions including first-order delays and dead times as elements in the embodiment described above, the representation of dynamic-characteristics models is not limited to the above example. For example, as expressed in equations (4) and (5) below, the dynamic-characteristics models $G_1(s)$ to $G_5(s)$ may be represented in the form of second-order or higher-order transfer functions.

[Formula 4]

$$G(s) = \frac{y(s)}{u(s)} \tag{4}$$
$$= \frac{b_m s^m + b_{m-1} s^{m-1} + \ldots + b_1 s + b_0}{s^n + a_{n-1} s^{n-1} + \ldots + a_1 s + a_0}$$

$$G(s) = \frac{y(s)}{u(s)} \tag{5}$$
$$= \frac{b_m s^m + b_{m-1} s^{m-1} + \ldots + b_1 s + b_0}{s^n + a_{n-1} s^{n-1} + \ldots + a_1 s + a_0} e^{-\tau s}$$

Equation (4) above is an equation including delay elements as coefficients, and equation (5) is an equation in which a dead time is considered in addition to equation (4).

Furthermore, in the case where identification is performed by using the dynamic-characteristics models $G_1(s)$ to $G_5(s)$ represented by second-order or higher-order transfer functions as described above, the monitoring unit 13 may determine the timing of adjustment of a control parameter on the basis of the temporal variations of at least one of the dead time and the coefficients of the transfer functions.

Figure 9:
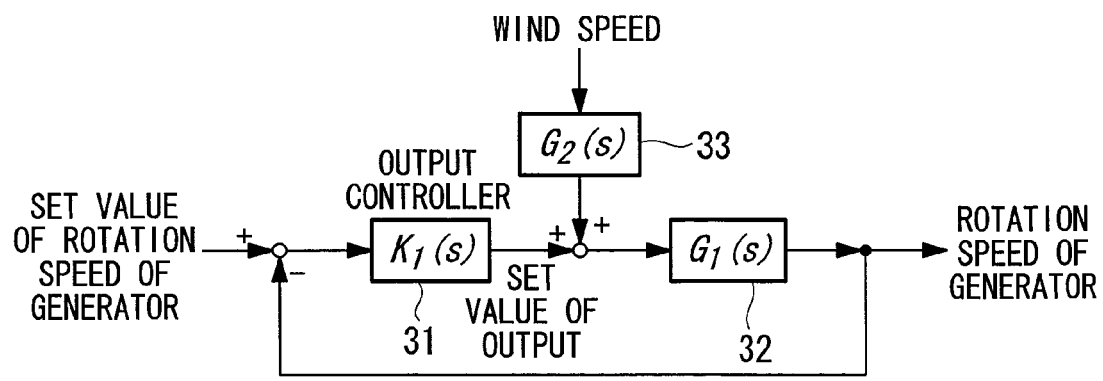
FIG. 9 is a diagram showing another example configuration of the identification model in the case of the first operating range and the second operating range.

Furthermore, although the dynamic-characteristics parameters of the dynamic-characteristics models $G_1(s)$ to $G_5(s)$ are calculated by using the identification models shown in FIGS. 4 and 5 in the embodiment described above, the identification models are not limited to the example. For example, in the case of the first or second operating range, an identification model shown in FIG. 9 may be used instead of the identification model shown in FIG. 4. The identification model shown in FIG. 9 is configured such that an output of the second dynamic-characteristics model 33 is input between the output controller 31 and the first dynamic-characteristics model 32, and an output of the output controller 31 and an output of the second dynamic-characteristics model 33 are added together, and the result serves as an input to the first dynamic-characteristics model 32.

Figure 10:
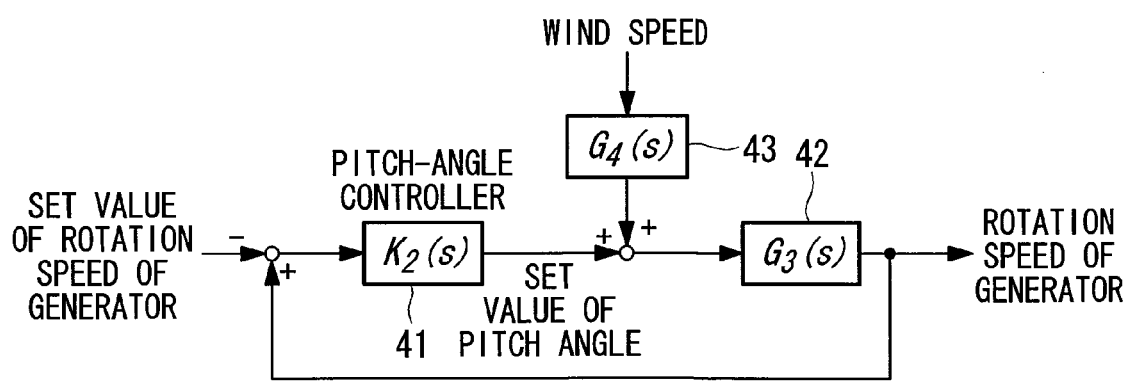
FIG. 10 is a diagram showing another example configuration of the identification model in the case of the third operating range.

Similarly, for example, in the case of the third operating range, an identification model shown in FIG. 10 may be used instead of the identification model shown in FIG. 5. The identification model shown in FIG. 10 is configured such that an output of the fourth dynamic-characteristics model 43 is input between the pitch-angle controller 41 and the third dynamic-characteristics model 42, and an output of the pitch-angle controller 41 and an output of the fourth dynamic-characteristics model 43 are added together, and the result serves as an input to the third dynamic-characteristics model 42.

As described above, even if the configurations of the identification models are changed, it is possible to achieve the advantage described above.

Furthermore, the wind-turbine-dynamic-characteristics monitoring apparatus 10 according to the embodiment described above may be provided inside a wind turbine or outside a wind turbine. Furthermore, such apparatuses may be provided in one-to-one relationship with wind turbines, or a single such apparatus may be provided for a plurality of wind turbines.

Figure 11:
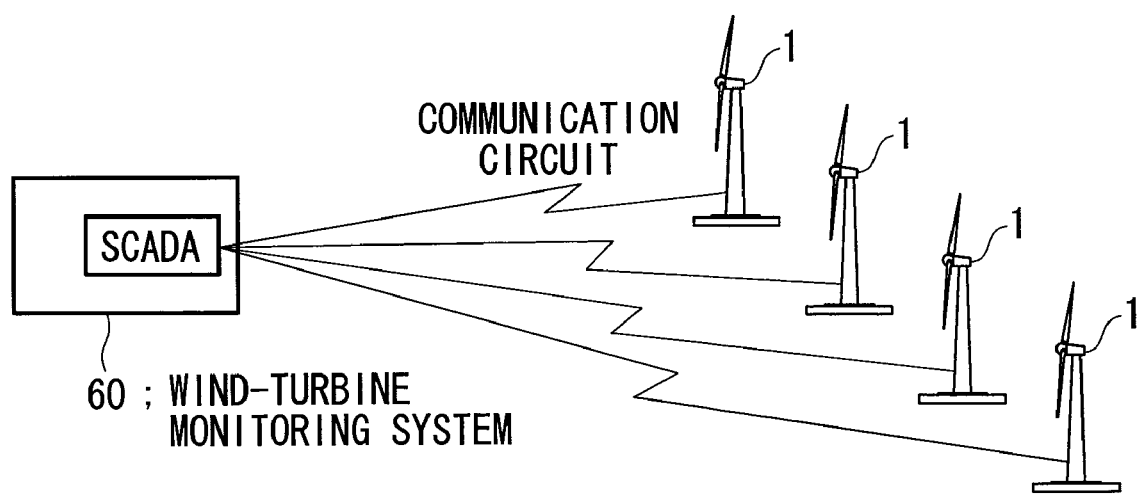
FIG. 11 is a diagram showing a wind-turbine monitoring system according to an embodiment of the present invention.

Furthermore, the wind-turbine-dynamic-characteristics monitoring apparatus 10 according to this embodiment may be provided in a wind-turbine monitoring system 60 that controls the operation of a plurality of wind turbines, as shown in FIG. 11. In this case, input/output data needed for identification is transmitted from each of the wind turbines 1 via a communication circuit.

Furthermore, when it is determined that adjustment of a control parameter is needed, an adjusted control parameter is sent to each of the wind turbines 1 via the communication circuit. At this time, the control parameter may be changed on a per-wind-turbine basis, or the control parameter may be changed so that the parameter becomes the same in areas with substantially the same terrain or wind conditions. The control parameter is managed at the wind-turbine monitoring system 60 on a per-wind-turbine basis.

Although the embodiment described above is configured such that the storage unit 12 that stores data calculated by the identifying unit 11 and other information is provided and the monitoring unit 13 reads out information from the storage unit 12, alternatively, data may be input directly from the identifying unit 11 to the monitoring unit 13 without the storage unit 12 therebetween. In this case, on the basis of the data input from the identifying unit 11, the monitoring unit 13 may update a temporal variation table, such as the one shown in FIG. 7. Accordingly, it becomes possible to constantly ascertain the temporal variation of a dynamic-characteristics parameter.

Although the user is notified of the need for adjustment of a control parameter through display on the display unit 14 in this embodiment, the notification method is not limited to the example, and other methods may be employed, for example, notification by means of voice or sound, notification by turning on a lamp, etc.

The invention claimed is:

1. A wind-turbine-dynamic-characteristics monitoring apparatus, comprising:
    an identifying unit configured to identify each of a plurality of dynamic-characteristics parameters by using corresponding one of a plurality of dynamic-characteristics models of a wind turbine for each of a plurality of operating ranges determined based on wind speed; and
    a monitoring unit configured to
        monitor, for each of the operating ranges, a temporal variation of the dynamic-characteristics parameters identified by the identifying unit and
        determine whether or not an adjustment of a control parameter of the wind turbine is needed based on the temporal variation of the dynamic-characteristics parameters.

2. A wind-turbine-dynamic-characteristics monitoring apparatus according to claim 1, wherein the monitoring unit is further configured to
    classify the dynamic-characteristics parameters into a plurality of classes based on wind speed or based on a combination of wind speed and wind direction, and
    monitor the temporal variation of the dynamic-characteristics parameters for each of the classes.

3. A wind-turbine monitoring system configured to monitor operation statuses of a plurality of wind turbines and issue control instructions to the wind turbines, the wind-turbine monitoring system comprising a wind-turbine-dynamic-characteristics monitoring apparatus according to claim 1.

4. A wind-turbine monitoring system according to claim 3, wherein the monitoring unit is further configured to
    classify the dynamic-characteristics parameters into a plurality of classes based on wind speed or based on a combination of wind speed and wind direction, and
    monitor the temporal variation of the dynamic-characteristics parameters for each of the classes.

5. A wind-turbine monitoring system according to claim 3, wherein the monitoring unit is configured to determine that the adjustment of the control parameter of the wind turbine is needed when the temporal variation of the dynamic-characteristics parameters exceeds a predetermined threshold with respect to an initial value.

6. A wind-turbine-dynamic-characteristics monitoring apparatus according to claim 1, wherein the monitoring unit is configured to determine that the adjustment of the control parameter of the wind turbine is needed when the temporal variation of the dynamic-characteristics parameters exceeds a predetermined threshold with respect to an initial value.

7. A wind-turbine-dynamic-characteristics monitoring method, comprising:
    identifying each of a plurality of dynamic-characteristics parameters by using corresponding one of a plurality of dynamic-characteristics models of a wind turbine for each of a plurality of operating ranges determined based on wind speed;
    monitoring, for each of the operating ranges, a temporal variation of the dynamic-characteristics parameters identified at the identifying; and
    determining whether or not an adjustment of a control parameter of the wind turbine is needed based on the temporal variation of the dynamic-characteristics parameters.

8. A wind-turbine-dynamic-characteristics monitoring method according to claim 7, wherein the monitoring includes
    classifying the dynamic-characteristics parameters into a plurality of classes based on wind speed or based on a combination of wind speed and wind direction, and
    monitoring the temporal variation of the dynamic-characteristics parameters for each of the classes.

9. A wind-turbine-dynamic-characteristics monitoring method according to claim 7, wherein the determining includes determining that the adjustment of the control parameter of the wind turbine is needed when the temporal variation of the dynamic-characteristics parameters exceeds a predetermined threshold with respect to an initial value.

* * * * *